_United States Patent Office_

3,471,548
Patented Oct. 7, 1969

3,471,548
GAMMA-AMINO-BETA-(PARA-HALOPHENYL)-BUTYRIC ACIDS AND THEIR ESTERS
Heinrich Keberle, Basel, Johann Werner Faigle, Riehen, and Max Wilhelm, Allschwil, Switzerland, assignors to Ciba Corporation, New York, N.Y., a corporation of Delaware
No Drawing. Filed June 30, 1964, Ser. No. 379,365
Claims priority, application Switzerland, July 9, 1963, 8,537/63; May 22, 1964, 6,729/64
Int. Cl. C07c 101/00, 101/02
U.S. Cl. 260—471    14 Claims

ABSTRACT OF THE DISCLOSURE

New compounds of the formula

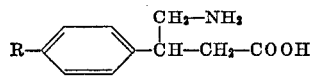

R=halogen, e.g. Cl, Br, F, CF$_3$; for example: γ-amino-β-(para-chlorophenyl)-butyric acid; use: central inhibiting agents, e.g. muscle relaxants.

---

The present invention relates to new amino acids. More especially it concerns the amino acids of the formula

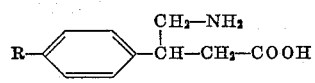

where R represents a halogen atom, for example a fluorine, chlorine or bromine atom, or the pseudohalogen trifluoromethyl, and their salts.

The new compounds have valuable pharmacological properties; in particular, they have central inhibiting properties. Thus, for example in experiments performed on mice, cats, rabbits and dogs they inhibit the activity of neurons involved in motor control. They can therefore be used as agents inhibiting the central nervous system. The new compounds are also valuable as intermediates, for example for use in the manufacture of medicaments.

γ-Amino-β-(para-chlorophenyl)-butyric acid should be mentioned especially.

The new compounds are manufactured in the usual manner: For example, in a compound of the formula

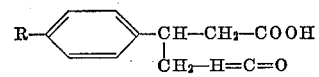

in which R has the meaning given above, the isocyanate group is converted into the amino group by adding on water and decarboxylating the resulting carbamic acid.

The reaction is performed in the known manner, in the presence or absence of diluents at room temperature or with cooling or heating, under atmospheric or superatmospheric pressure.

The new compounds can also be manufactured by hydrolysing a compound of the formula

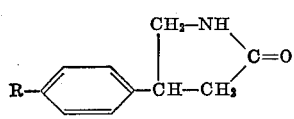

or

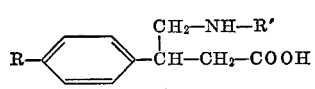

or

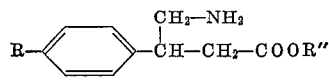

in which formulae R has the meaning given above, R' represents an acyl group, such as a lower alkanoyl group (e.g. an acetyl, propionyl or butyryl group), a phenyl-lower alkanoyl group (e.g. a phenylacetyl group) or a benzoyl group, and —COOR" represents an esterified carboxyl group (R" representing for example a lower alkyl or phenyl lower alkyl group, such as a methyl, ethyl, propyl, butyl or benzyl group).

The hydrolysis is carried out in the usual manner, for example in the presence of an aqueous acid or alkali at room temperature or with heating.

Depending on the reaction conditions and starting materials used the final products are obtained in the free form or in the form of their salts which are likewise included in the present invention. Thus, for example, basic, neutral, acid or mixed salts, possibly also hemi-, mono-, sesqui- or poly-hydrates thereof, may be obtained. The salts of the new compounds can be converted in the known manner into the free compounds; acid addition salts, for example, with basic agents such as alkalies or ion exchange resins, salts with bases by reaction with acid agents, such as acids. On the other hand, a resulting free amino acid can form salts with bases, especially therapeutically acceptable bases, e.g. metal hydroxides or basic salts, especially alkali metal or alkaline earth metal hydroxides, such as the hydroxides of sodium, potassium or calcium, or with alkali metal carbonates, such as sodium or potassium carbonate, with ammonia or with organic amines, or with organic or inorganic acids. Acid addition salts are preferably manufactured with therapeutically acceptable acids, for example hydrohalic acids, sulfuric, a phosphoric, nitric, perchloric acid; aliphatic, alicyclic, aromatic or heterocyclic carboxylic or sulfonic acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicyclic or para-amino-salicylic, embonic, methanesulfonic, ethanesulfonic, hydroxy-ethanesulfonic, ethylenesulfonic acid; halogenobenzenesulfonic, toluenesulfonic, naphthalene-sulfonic acids or sulfanilic acid; methionine, tryptophan, lysine or arginine.

The afore-mentioned and other salts of the new compounds, for example the picrates, may also be used for purifying the resulting free compounds by converting the free compound into a salt thereof, isolating the latter and liberating the free compound again from the salt. Taking into consideration the close relationship between the new compounds in the free form and in the form of their salts, whenever the free compounds are mentioned above or hereinafter, the corresponding salts are likewise concerned whenever this applies.

The new compounds may be present in the form of racemates which can be resolved in the usual manner into their optical antipodes.

The invention includes also any modification of the present process in which an intermediate obtainable at any stage of the process is used as starting material and any remaining step is carried out, or the process is discontinued at any stage thereof, or in which the starting materials are formed under the reaction conditions, or in which the reactants are used in the form of their salts. In particular, the isocyanate groups may be formed in situ. This may be performed using various methods, for example by the Hoffmann degradation of a carbamyl group. The Hoffmann degradation is carried out in the usual manner, for example by treatment with an alkali metal hypohalite, for example with sodium hypobromite.

The starting material used in this reaction is advantageously a compound of the formula

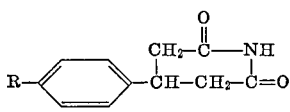

which is converted into the amide acid by treatment with an alkaline agent, such as an alkali metal hydroxide solution, and the Hoffmann degradation is then performed without isolating the intermediate.

Starting materials preferably used in the performance of the reactions of the invention are those which give rise to the afore-mentioned preferred final products.

The starting materials are known or can be prepared by known methods.

The new compounds may be used as medicaments, for example in the form of pharmaceutical preparations which contain them in the free form or in the form of their salts in admixture or conjunction with an organic or inorganic, solid or liquid pharmaceutical excipient suitable for enteral or parenteral administration. Suitable excipients are substances that do not react with the new compounds, for example water, gelatine, lactose, starches, stearyl alcohol, magnesium stearate, talcum, vegetable oils, benzyl alcohols, gums, propyleneglycols, white petroleum jelly, cholesterol or other known medicinal excipients. The pharmaceutical preparations may be tablets, dragees or capsules, or in liquid form solutions, suspensions or emulsions. They may be sterilized and/or may contain assistants, such as preservatives, stabilizers, wetting agents or emulsifiers, solutions promoters, salts for regulating the osmotic pressure or buffers. They may also contain other therapeutically valuable substances. The pharmaceutical preparations are formulated by the usual methods.

The pharmaceutical preparations for enteral (for example oral or rectal) administration contain with advantage about 1–60% of active principle or about 1 mg. to 1 g., more especially 10 mg. to 0.5 g., of the active principle per unit dose, whereas those for parenteral administration contain about 0.1 to 20% of active principle, or 0.3 mg. to 0.3 g., more especially 5 mg. to 150 mg., of active principle per unit dose.

The new compounds may also be used in the form of animal fodder or of additives to animal fodder, using for example, the conventional extending and diluting agents or fodders respectively.

The following examples illustrate the invention.

EXAMPLE 1

42.45 g. of β-(para-chlorophenyl)-glutaric acid imide are stirred into a solution of 8.32 g. of sodium hydroxide in 200 ml. of water. The mixture is heated for 10 minutes at 50° C., and the solution thus formed is cooled to 10–15° C. At this temperature there are then added dropwise a solution of 40.9 g. of sodium hydroxide in 200 ml. of water and then, in the course of 20 minutes, 38.8 g. of bromine. When all has been dropped in, the batch is stirred for 8 hours at 20 to 25° C. The reaction solution is then cautiously adjusted with concentrated hydrochloric acid to pH=7, whereupon finely crystalline γ-amino-β-(parachlorophenyl)-butyric acid of the formula

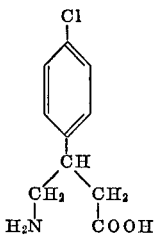

settles out. To purify it, it is recrystallized from water. M.P. 206–208° C.

The β-(para-chlorophenyl)-glutaric acid imide used as starting material can be prepared in the following manner:

55 g. of β-(para-chlorophenyl)-glutaric anhydride are stirred in portions at room temperature into 110 ml. of concentrated aqueous ammonia, with the temperature of the reaction mixture rising to 40–50° C. On completion of the addition the batch is heated for 30 minutes at 60–70° C. to complete dissolution. The clear solution is evaporated to dryness in a water-jet vacuum and the residue is heated for 2½ hours in an oil bath at 185° C., to yield crude β-(para-chlorophenyl)-glutaric acid imide of the formula

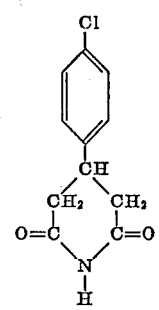

which is recrystallized from dioxane and melts at 170–171° C.

EXAMPLE 2

A mixture of 4.85 g. of 4-(para-chlorophenyl)-pyrrolidone-(2) and 10 ml. of concentrated hydrochloric acid is refluxed for 8 hours. The clear solution formed is evaporated to dryness in a water-jet vacuum at 50–60° C. The crystalline residue is suspended in 10 ml. of acetone and filtered off. The crystallizate is dissolved in 10 ml. of water and adjusted with N-sodium hydroxide solution to pH 7, whereupon crystalline γ-amino-β-(para-chlorophenyl)-butyric acid of the formula

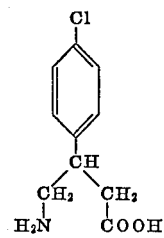

is obtained which, after having been recrystallized from water, melts at 206–208° C.

The starting material used, 4-(para-chlorophenyl)-pyrrolidone-(2), can be prepared, for example, by catalytic reduction of β-cyano-para-chlorodihydrocinnamic acid ethyl ester in the presence of palladium black.

EXAMPLE 3

10 grams of γ-amino-β-(para-chlorophenyl)-butyric acid ethyl ester hydrochloride are boiled under reflux for 8 hours in 20 ml. of concentrated aqueous hydrochloric acid. The solution is then evaporated to dryness at 40 to 50° C. at a water-jet vacuum. The crystalline, crude hydrochloride of γ-amino-β-(para-chlorophenyl)-butyric acid is obtained as residue. For purification the hydrochloride is suspended in acetone, filtered and flushed with acetone. The purified hydrochloride is dissolved in 20 ml. of water and the pH value of the solution is adjusted to 6–7 by the addition of 2 N sodium hydroxide solution. Free γ-amino-β-(para-chlorophenyl)-butyric acid crystallizes out. For purification the compound is recrystallized from water; M.P. 206–208° C.

The γ-amino-β-(para-chlorophenyl)-butyric acid ethyl ester hydrochloride used as starting material may be obtained by catalytic reduction of β-cyano-para-chlorodihydrocinnamic acid ethyl ester in the presence of palladium black and 1 mol of hydrochloric acid.

EXAMPLE 4

8.5 grams of γ-acetylamine-β-(para - chlorophenyl)-butyric acid are boiled under reflux for 2 hours in 20 ml. of 3 N aqueous hydrochloric acid. During the reaction a clear, homogeneous solution of the hydrochloride of γ-amino-β-(para-chlorophenyl)-butyric acid formed from the initially two-phase mixture. After cooling, the solution is adjusted to a pH value of 6–7 with 2 N sodium hydroxide solution. γ-amino-β-(para-chlorophenyl)-butyric acid crystallizing out in a crude form. The compound is recrystallized from water; M.P. 206–208° C.

The γ-acetylamino-β-(para-chlorophenyl)-butyric acid used as starting material is prepared as follows:

β-Cyano-para-chlorodihydrocinnamic acid ethyl ester is reduced with lithium aluminum hydride to 4-amino-3-(para-chlorophenyl)-1-butanol. The latter is acetylated by reaction with isopropenyl acetate at the nitrogen atom. The resulting 4-acetylamino-3-(para - chlorophenyl) - 1-butanol may then be oxidized to γ-acetylamino-β-(para-chlorophenyl)-butyric acid.

EXAMPLE 5

23.0 grams of β-(para-bromophenyl)-glutaric acid imide is introduced into a solution of 4.0 grams of sodium hydroxide in 90 cc. of water and the whole heated for 10 minutes at 50° C. The reaction mixture is then cooled to room temperature. 20 grams of sodium hydroxide in 90 cc. of water are then added and 16.0 grams of bromine are added dropwise in the course of 15 to 20 minutes. The batch is stirred for 8 hours at room temperature. The pH value is adjusted to about 4 by the addition of concentrated hydrochloric acid, and the batch is then heated for 10 minutes at 50° C. The solution is filtered, cooled and neutralized, to yield γ-amino-β-(para-bromophenyl-butyric acid of the formula

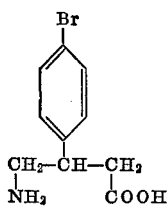

in the form of crystals melting at 228–229° C.

The β-(para-bromophenyl)-glutaric acid imide used as starting material is prepared as follows:

4 cc. of piperidine are added to a mixture of 54 grams of para-bromobenzaldehyde, 76 grams of ethyl acetoacetate and 20 cc. of alcohol. After a short time para-bromobenzylidene bisaceto-acetic ester precipitates which, after recrystallization from alcohol, melts at 150–153° C.

66 grams of the above ester are heated at the boil with 150 cc. of sodium hydroxide solution of 50% strength in 150 cc. of alcohol for 3 hours. The solution is treated with 200 ml. of water and the alcohol distilled off under 12 mm. pressure. The distillation residue is diluted with 300 ml. of water and the pH value adjusted to 2 by the addition of concentrated hydrochloric acid. After extraction with ether β-(para-bromophenyl)-glutaric acid is obtained which melts at 175–176° C.

41 grams of β-(para-bromophenyl)-glutaric acid are boiled with 160 ml. of acetic anhydride for 1 hour. The acetic anhydride is then distilled off in vacuo to leave β-(para-bromophenyl)-glutaric acid anhydride which, after being washed with ether, melts at 164–166° C.

32 grams of β-(para-bromophenyl)-glutaric acid anhydride are slowly introduced into 80 cc. of concentrated ammonia solution and heated for 2 hours at 60–70° C. The reaction mixture is evaporated to dryness in vacuo and the residue heated for two and a half hours at 185° C. to yield β-(para-bromophenyl)-glutaric acid imide which, after recrystallization from dimethylformamide and water, melts at 180° C.

EXAMPLE 6

Tablets, each containing 100 mg. of the active principle, can be prepared, for example, from the following ingredients:

| | Mg. |
|---|---|
| γ-Amino-β-(para-chlorophenyl)-butyric acid | 100 |
| Lactose | 95 |
| Wheat starch | 54 |
| Gelatine | 6 |
| Arrowroot | 24 |
| Stearic acid | 6 |
| Talcum | 15 |
| | 300 |

Preparation of the tablets.—γ-Amino-β-(para-chlorophenyl)-butyric acid is homogeneously mixed with lactose and wheat starch and pressed through a 0.5 mm. mesh sieve. Gelatine is dissolved in 10 times its own weight of water; the powder mixture is evenly moistened with this solution and kneaded until a plastic mass has formed which is then pressed through a 3 mm. mesh sieve, dried at 45° C. and then sifted through a 1.5 mm. mesh sieve. Arrowroot, stearic acid and talcum are finely sifted and worked into the resulting mixture, and the paste is then made up in the usual manner into tablets of 9 mm. diameter and 300 mg. weight.

EXAMPLE 7

In an analogous manner to that described in Examples 1 and 5 there may be prepared from β-(para-fluorophenyl)-glutaric acid imide or β-(para-trifluoromethylphenyl)-glutaric acid imide the γ-amino-β-(para-fluorophenyl)-butyric acid or the γ-amino-β-(para-trifluoromethylphenyl)-butyric acid, respectively.

What is claimed is:

1. A compound of the formula

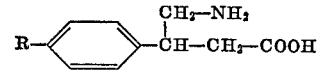

in which R is halogen.

2. A compound of the formula

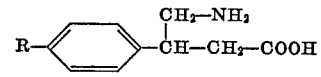

in which R is a member selected from the group consisting of fluorine, chlorine, bromine and trifluoromethyl.

3. γ-Amino-β-(para-chlorophenyl)-butyric acid.
4. γ-Amino-β-(para-bromophenyl)-butyric acid.
5. A salt of a compound claimed in claim 1.
6. A salt of a compound claimed in claim 2.
7. A salt of the compound claimed in claim 3.
8. A salt of the compound claimed in claim 4.
9. A compound of the formula

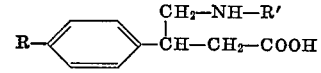

in which R is halogen and R' is a member selected from the group consisting of lower alkanoyl, phenyl-lower alkanoyl and benzoyl.

10. A compound of the formula

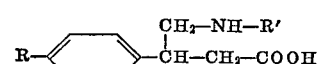

in which R is a member selected from the group consisting of fluorine, chlorine, bromine and trifluoromethyl, and R' is a member selected from the group consisting of lower alkanoyl, phenyl-lower alkanoyl and benzoyl.

11. γ-Acetylamino-β-(p-chlorophenyl)-butyric acid.

12. A salt of a compound of the formula

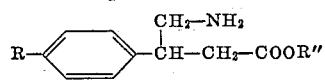

in which R is halogen and COOR″ is esterified carboxyl in which R″ is a member selected from the group consisting of lower alkyl and phenyl-lower alkyl.

13. A salt of a compound of the formula

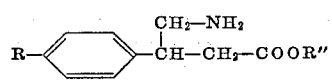

in which R is a member selected from the group consisting of fluorine, chlorine, bromine and trifluoromethyl and R″ is a member selected from the group consisting of lower alkyl and phenyl-lower alkyl.

14. A salt of γ-amino-β-(para-chlorophenyl)-butyric acid ethyl ester.

References Cited
UNITED STATES PATENTS 3,125,583   3/1964   Leonard.

LORRAINE A. WEINBERGER, Primary Examiner

L. ARNOLD THAXTON, Assistant Examiner

U.S. Cl. X.R.

260—281, 326.5, 501.11, 501.16, 518; 424—309, 319